United States Patent
Todd et al.

(10) Patent No.: US 10,009,360 B1
(45) Date of Patent: Jun. 26, 2018

(54) MALWARE DETECTION AND DATA PROTECTION INTEGRATION

(71) Applicant: EMC Corporation, Hopkinton, MA (US)

(72) Inventors: Stephen Todd, Shrewsbury, MA (US); Mark Twomey, Watergrasshill (IE)

(73) Assignee: EMC IP Holding Company LLC, Hopkinton, MA (US)

(*) Notice: Subject to any disclaimer, the term of this patent is extended or adjusted under 35 U.S.C. 154(b) by 153 days.

(21) Appl. No.: 15/081,279

(22) Filed: Mar. 25, 2016

(51) Int. Cl.
*G06F 21/00* (2013.01)
*H04L 29/06* (2006.01)

(52) U.S. Cl.
CPC ...... *H04L 63/1416* (2013.01); *H04L 63/1425* (2013.01)

(58) Field of Classification Search
CPC .......... H04L 63/1416; H04L 63/1425
See application file for complete search history.

(56) References Cited

U.S. PATENT DOCUMENTS

| | | | | |
|---|---|---|---|---|
| 9,654,485 | B1* | 5/2017 | Neumann | H04L 63/1416 |
| 2017/0140156 | A1* | 5/2017 | Gu | G06F 21/602 |
| 2017/0244741 | A1* | 8/2017 | Ferrer | H04L 63/1433 |

* cited by examiner

*Primary Examiner* — Kendall Dolly
(74) *Attorney, Agent, or Firm* — Ryan, Mason & Lewis, LLP

(57) ABSTRACT

A computer system is monitored via malware detection modules deployed throughout input/output layers of the computer system. Each malware detection module is configured to detect activity associated with malware present in the computer system. Upon detection of malware activity in one or more input/output layers of the computer system, one or more of the malware detection modules generate and send respective messages reporting the detected activity to a central malware alert engine. The one or more messages are received at the central malware alert engine from the one or more malware detection modules. In response to the one or more received messages, the central malware alert engine alerts one or more portions of a data protection system of the computer system to enable the data protection system to take one or more remedial actions to protect the computer system from the malware present in the computer system.

20 Claims, 5 Drawing Sheets

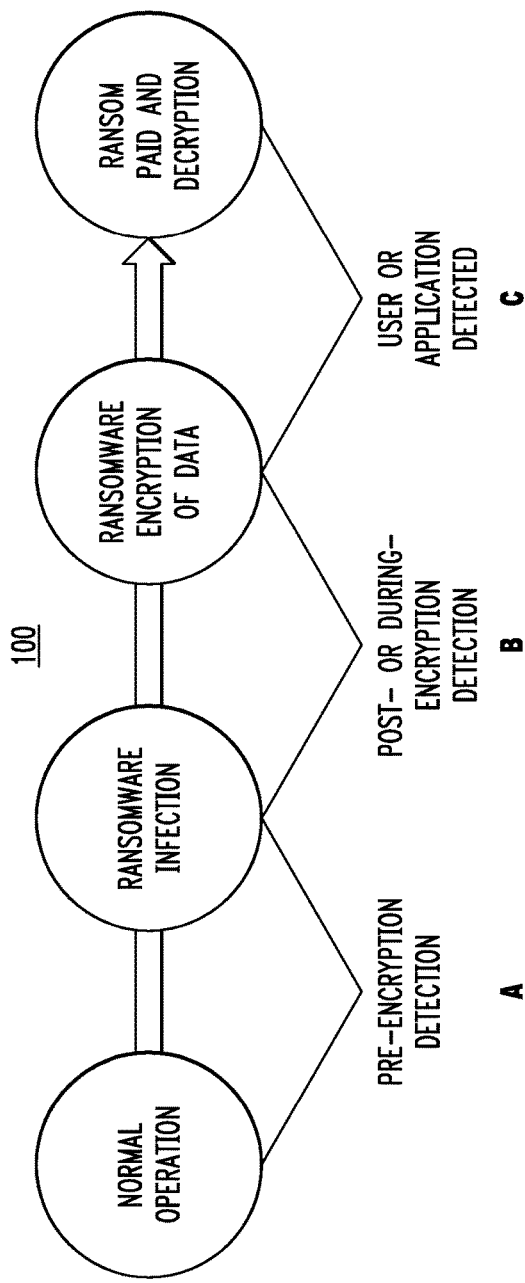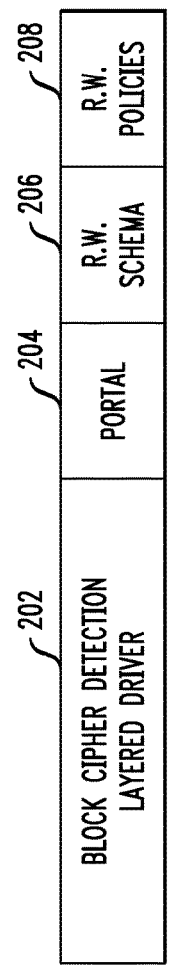

US 10,009,360 B1

MALWARE DETECTION AND DATA PROTECTION INTEGRATION

FIELD

The field relates generally to computer systems and, more particularly, to malware detection.

BACKGROUND

Malicious software or "malware" is any software used to interfere with computer system operations, gain unauthorized access to computer systems, acquire private or otherwise sensitive information, display unwanted advertising, or conduct any other harmful activities. Forms of malware include, but are not limited to, computer viruses, worms, trojan horses, ransomware, spyware, adware, scareware, and the like. Malware can take the form of executable code, scripts, active content, and other software.

While many of the forms of malware can cause harm to computer systems and hardship to its users, one form in particular, i.e., ransomware, is troublesome for data centers that host application programs (applications) and store large amounts of critical data for enterprises and clients. Ransomware is malicious program code that encrypts data and prevents applications access to that data until a ransom is paid.

SUMMARY

Embodiments of the invention provide techniques for integrating malware detection mechanisms with data protection mechanisms in a computing environment.

For example, in one embodiment, a method comprises the following steps. A computer system is monitored via malware detection modules deployed throughout input/output layers of the computer system. Each malware detection module is configured to detect activity associated with malware present in the computer system. Upon detection of malware activity in one or more input/output layers of the computer system, one or more of the malware detection modules generate and send respective messages reporting the detected activity to a central malware alert engine. The one or more messages are received at the central malware alert engine from the one or more malware detection modules. In response to the one or more received messages, the central malware alert engine alerts one or more portions of a data protection system of the computer system to enable the data protection system to take one or more remedial actions to protect the computer system from the malware present in the computer system.

Advantageously, illustrative embodiments provide malware detection modules deployed at various layers/levels of an input/output stack and data protection ecosystem (e.g., backup and recovery framework) of a computer system (e.g., cloud-based data center) and connect these malware detection modules to a central interface of a malware alert engine. In this manner, upon detection of malware in the input/output stack and/or data protection system (at any stage of a lifecycle of the malware within the computer system, i.e., before, during or after the resident malware performs its malicious activity), remedial measures can immediately be executed to eliminate or at least minimize the harmful effects of the malware. While illustrative embodiments are described herein with respect to ransomware, it is to be appreciated that alternative embodiments are not limited to this form of malware.

These and other features and advantages of the invention will become more readily apparent from the accompanying drawings and the following detailed description.

BRIEF DESCRIPTION OF THE DRAWINGS

FIG. 1 illustrates ransomware stages in a computer system, according to an embodiment of the invention.

FIG. 2 illustrates an encryption detection insertion package (EDIP) module, according to an embodiment of the invention.

DETAILED DESCRIPTION

Figure 3:
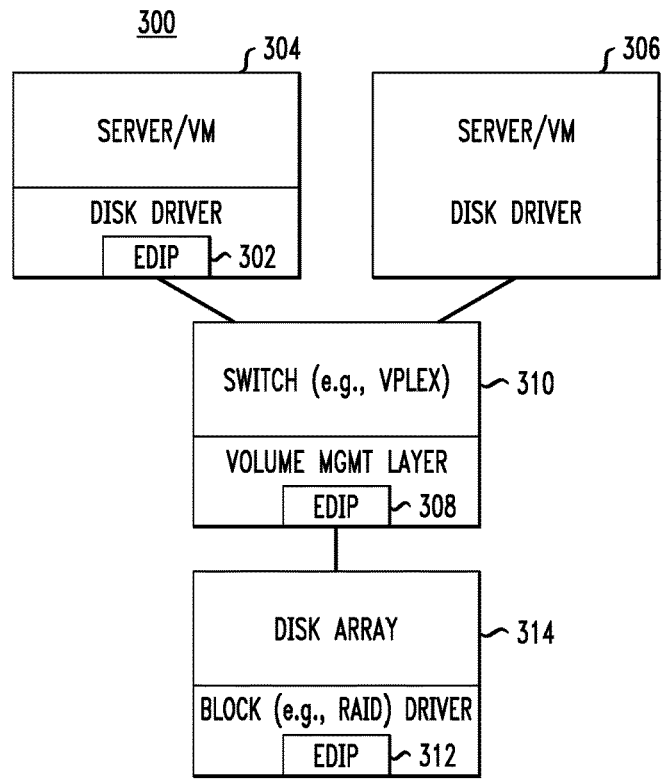
FIG. 3 illustrates deployment of EDIP modules in a block stack of a computer system, according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, while illustrative embodiments are described below in the context of ransomware, alternative embodiments apply to any other forms of malware or mechanisms that interfere with computer system operations, gain unauthorized access to computer systems, acquire private or otherwise sensitive information, display unwanted advertising, or conduct any other harmful activities.

Ransomware, once installed and operational on a system, potentially has access to a variety of data sets (e.g., file systems, databases, raw LUNs (logical storage units), etc.) and can perform encryption operations on those data sets to prevent application access.

It is realized herein that early detection of ransomware on a server can trigger new algorithms that invoke data protection techniques. If ransomware installation goes undetected, traditional input/output (I/O) stacks (e.g., server-based drivers, network devices, and storage target software) represent a new opportunity to detect ransomware encryption traffic. The encrypted traffic that overwrites application data appears as normal write operations to these stacks.

Embodiments of the invention realize that it is possible to monitor and analyze this write activity and detect encryption traffic activity at each level in the stack. More particularly, embodiments of the invention integrate detection mechanisms with data protection configuration application programming interfaces (APIs) to take measures to preserve the original data, flag them as potential ransomware targets, and implement additional measures (e.g., restore/recovery procedures).

FIG. 1 illustrates stages of a ransomware lifecycle 100 in a computer system (e.g., data center), over which embodiments of the invention can detect ransomware and act to eliminate or mitigate the ransomware. The lifecycle 100 comprises a pre-encryption detection phase A (i.e., a time period between normal operation of the computer system and ransomware infection somewhere in the computer system), a post- or during-encryption detection phase B (i.e., a time period between ransomware infection and the ransomware having encrypted the data in the computer system), and a user or application detected phase C (i.e., a time period following ransomware encryption of the data and a ransom being paid and the encrypted data being decrypted).

It is realized herein that phase C is the stage in the lifecycle 100 when ransomware detection is most common. This is the time period when ransomware has already infected the computer system, encrypted the data, and makes it presence known by demanding a ransom fee of the user/administrator.

Detection in phase A (pre-encryption detection of ransomware) is becoming more common and there are tools in the industry to assist in this detection, e.g., RSA ECAT ransomware detection products available from EMC Corporation of Hopkinton, Mass. These existing tools, however, are not tied into to the data protection ecosystem to take immediate remedial measures.

Detection in phase B (detection after ransomware installation) is less common and there are no existing solutions that identify potential encryption traffic and alert to a common data protection ecosystem. Phase B is further complicated by the variety of locations in the I/O stack (e.g., server, network, storage device, etc.) and the variety of access protocols (e.g., block, file, object, key-value, database, etc.) vulnerable to ransomware.

Lastly, the ransomware may target the actual data protection ecosystem itself including for example, but not limited to, server message block (SMB) protocol devices and network-attached storage (NAS) devices. If the ransomware successfully encrypts the backup data, then the backup data becomes worthless.

Embodiments of the invention address the above-mentioned and other drawbacks related to ransomware detection and neutralization.

It is realized herein that there are I/O patterns that indicate an encryption operation is in progress. For example, if ransomware is installed undetected, it may begin the process of opening up files (production or backup files) in a computer system. Consider a ransomware module that encrypts via a block cipher algorithm. This deterministic algorithm works by reading fixed-length groups of data blocks and transforms them using a symmetric key. Many block cipher algorithms (e.g., Data Encryption Standard or DES algorithm) issue a standard and predictable I/O pattern in the process of replacing unencrypted data with encrypted transformations.

Block cipher detection approaches are just one example of encryption detection algorithms. However, the main problem with the existing block cipher approach is the lack of integration with the data protection ecosystem for immediate notification and the potential to take early stage protection actions and potential remediation.

It is realized herein according to illustrative embodiments that a block cipher detection algorithm can be implemented at a variety of points within the stack, e.g.: (i) within a block device driver underneath the application; (ii) within a multi-pathing driver in the server or switch; (iii) within the forwarding mechanism of a network device; and/or (iv) within the microcode or firmware of a storage device. The large attack surface for ransomware to operate complicates the ability of encryption detection algorithms to integrate with the data protection ecosystem.

Furthermore, it is realized herein that the production system may leverage encryption as part of its normal operation. This raises the question of how to differentiate between production algorithms such as file encryption of rights-managed files (or crypto file systems), and the malicious encryption of a ransomware module, e.g., CryptoWall. It is further realized herein that a system would have to be able to identify the difference between a system running GPG (GNU privacy guard) and a system that has been infected with CryptoWall.

In addition to the complexity of the large attack surface across multiple layers of storage routing, there also exists the complexity that a ransomware application can choose from a variety of data access techniques to encrypt data: file, object, block, key-value, structured query language or SQL, etc. While it is true that some of these access techniques eventually boil down to underlying block protocols (with encryption detection capability), there still may be some cases where either the encryption detection is ineffective or perhaps bypassed completely.

Embodiments of the invention overcome the above and other drawbacks by providing a standard ransomware-specific interface to a data protection portal which is purpose-built to combat ransomware infections. Advantageously, embodiments of the invention create a standard framework for insertion into any number of I/O stacks.

More particularly, and as will be explained in illustrative detail herein, a set of ransomware detection modules are deployed throughout input/output layers (e.g., I/O stack) of a computer system. A central ransomware alert engine (e.g., a ransomware alert center) is operatively coupled to the set of ransomware detection modules through an interface (e.g., portal). Each ransomware detection module (e.g., module 200 as will be explained below in the context of FIG. 2) detects activity associated with ransomware present in the computer system. Upon detection of ransomware activity in one or more input/output layers of the computer system, one or more of the ransomware detection modules generate and send respective messages reporting the detected activity to the central ransomware alert engine. The central ransomware alert engine receives the one or more messages and, in response, alerts one or more portions of a data protection system (e.g., backup and recovery systems) of the computer system to enable the data protection system to take one or more remedial actions to protect the computer system from the ransomware present in the computer system. The ransomware detection modules are also preferably deployed in the data protection system in order to detect ransomware activity in the backup and recovery mechanisms as well.

FIG. 2 illustrates an example of a ransomware detection module in the form of an encryption detection insertion package (EDIP) module 200.

As shown, the EDIP module 200 comprises program code 202 (labeled "Block cipher detection layered driver") configured to detect block cipher encryption activity attributable to ransomware in the I/O layer of the computer system in which the EDIP module is deployed. The program code could alternatively (or additionally) point to another location in the computer system or outside the computer system where the block cipher encryption detection algorithm resides and can be executed.

The EDIP module 200 also comprises program code 204 (labeled "Portal") configured to communicate with the central ransomware alert engine to send messages reporting the detected block cipher encryption activity of the ransomware.

Further, as shown, program code 206 (labeled "Ransomware Schema") is also provided in the module 202 and is configured to execute a set of directives to log information (i.e., logging directives) to assist the data protection system of the computer system to determine the one or more remedial actions to take in response to the ransomware. These remedial actions can include, but are not limited to, quarantine, removal, modification of ransomware, etc.

Next, program code 208 (labeled "Ransomware Policies") is configured to determine whether or not to generate or send a message to the central ransomware alert engine based on awareness of one or more policies relating to the ransomware activity in comparison to permitted activity in the computer system. In addition, EDIP module 200 may also include program code (part of program code 202, 204, 206 and/or 208) configured to recommend and/or initiate one or more remedial actions to take in response to the detected ransomware activity.

Thus, for example, the EDIP module 200 enables a block cipher encryption detection algorithm to be inserted into an I/O stack (e.g., a layered driver module) along with the location of the data protection portal (or instructions to write to a local SYSLOG instead of directly to a portal) and a syntax for communicating to the data protection portal.

Advantageously, the creation of an encryption detection algorithm in concert with an EDIP format allows a developer to emit highly-relevant logging output in response to potential ransomware activity. The above-described approach can also be used to integrate with tools such as the above-mentioned RSA ECAT, with the "block cipher detection layered driver" in 202 being replaced with RSA ECAT notification code that is modified to know how to alert the data protection ecosystem by leveraging the accompanying portal information (204), ransomware schema (206), and ransomware policies (208).

The EDIP approach can be leveraged and inserted into any number of protocols: block, file, object, key-value, etc., and written in any number of languages as well. In illustrative embodiments, all that is required is knowledge of how to communicate with the data protection portal and to have an understanding of the ransomware schemas and policies.

The EDIP approach can be integrated into any number of layers up and down an I/O stack: host driver, network switch, and storage system. This provides administrators with the ability to deploy EDIP modules in a flexible manner, e.g., only at the bottom-most layer.

Deploying EDIP detection at multiple layers and gathering logs from all layers allows for deeper anomaly detection, especially if ransomware appears in a side-channel approach that bypasses the traditional application stack (e.g., enters via a switch port after infecting a backup channel that can access underlying data).

The EDIP approach allows for an administrator to provide a rich set of logging directives for use by the EDIP module as it notifies the data protection ecosystem that it has noticed some unusual activity. For example, an individual EDIP module can be programmed to know that it is running at "server layer=true" and application="SAP" and echo these keywords back to the data protection ecosystem so that the ecosystem can make intelligent decisions.

Given that the EDIP module has the ability to know exactly where it is deployed and other context such as what application is involved or what protocol (e.g., file, block, object) is being used, the EDIP module can be configured to recommend (or initiate) specific remediation commands. For example, consider the following ransomware schema commands that the EDIP module can communicate back to the data protection portal:

Take a snapshot of a logical unit number (LUN), NAS file system or consistency group;

Take a snapshot of a VMware virtual volume;

Turn off replication and issue a failover event to a disaster recovery (DR) site;

Suspend network data management protocol (NDMP) backup operations to a file system suspected of hosting an infection; and/or Notify the data protection administrator identifying the client and file system affected and identifying the previous backups taken.

Furthermore, as mentioned above, the EDIP module has the ability to be programmed regarding policies that are in place in the environment. For example, an encryption detection EDIP module at the server layer may be instructed "GPG=allow". If the EDIP server driver detects encryption that is clearly "GPG" traffic, it can either not report or log the event, or report/log it at a lower priority.

The underlying shared storage system that receives traffic from that host, however, may be programmed as "GPG=disallow". These two seemingly disparate reporting approaches may be correlated to verify that only certain servers can permit GPG and the underlying shared storage can detect non-sanctioned GPG activity and flag it as potential ransomware.

Given that each EDIP module is given an access method to communicate encryption detection back to a portal, behind this portal lies the ransomware alert center that interacts with the data protection ecosystem (either manually or automatically). An example of this environment will be described below in the context of FIG. 6. The alert center is configured to notify the backup administration tool flagging an alert or other high priority notification.

With a large set of EDIP modules reporting back into a central portal, the ransomware alert center can frequently or otherwise periodically update EDIP modules with new policies, schema, and/or detection algorithms.

Referring now to FIG. 3, a deployment 300 of EDIP modules in a block stack of a computer system is depicted, according to an embodiment of the invention. More particularly, as shown, an EDIP module 302 is deployed at the application level of the block stack, i.e., in a disk driver of a host device (server/VM) 304. FIG. 3 also shows that an EDIP module is not deployed in a second host device (server/VM) 306. An EDIP module 308 is deployed at the network level of the block stack, i.e., in a volume management layer of a switch (VPLEX) 310. Yet another EDIP module 312 is deployed at the storage system level of the block stack, i.e., in a block (RAID) driver of a disk array 314.

Deployment 300 highlights that a device driver at the application level can watch the block read and write stream to detect encryption traffic. Similarly, EDIP functionality is implemented in the switch as well as the storage device. Deployment 300 also highlights a scenario where an infected application (VM) that does not contain ransomware detection (i.e., 306) is added into a storage area network and the infection is subsequently discovered by the underlying switch 310 (which does contain EDIP module 308) and/or disk array 314 (which does contain EDIP module 312).

Figure 4:
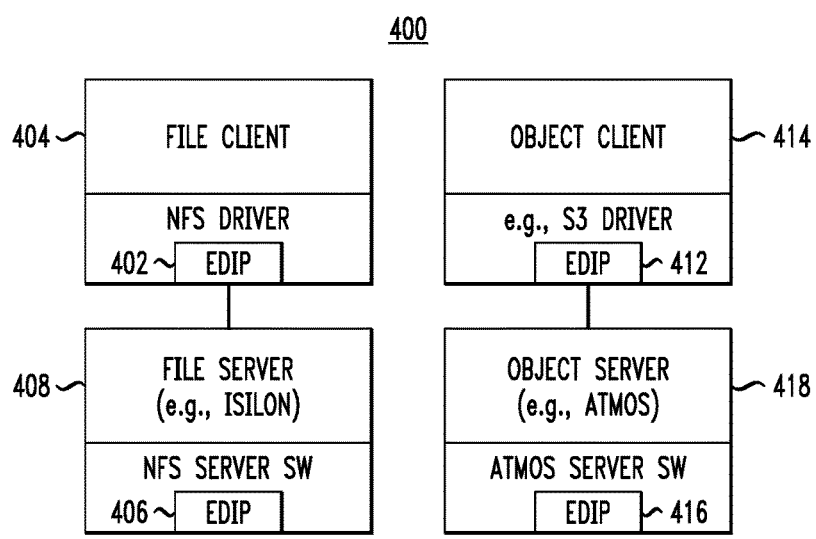
FIG. 4 illustrates deployment of EDIP modules in file and object layers of a computer system, according to an embodiment of the invention.

FIG. 4 illustrates a deployment 400 of EDIP modules in file and object layers of a computer system, according to an embodiment of the invention. More particularly, deployment 400 illustrates an EDIP configuration in which encryption detection is embedded in both the client side and server side of a file and object stack. As shown, for a file stack, an EDIP module 402 is deployed in a network file system (NFS) driver of a file client device 404, and an EDIP module 406 is deployed in NFS server software of a file server (e.g., Isilon) 408. For an object stack, an EDIP module 412 is deployed in an S3 driver of an object client device 414, and an EDIP module 416 is deployed in server software of an object server (e.g., Atmos) 418.

Figure 5:
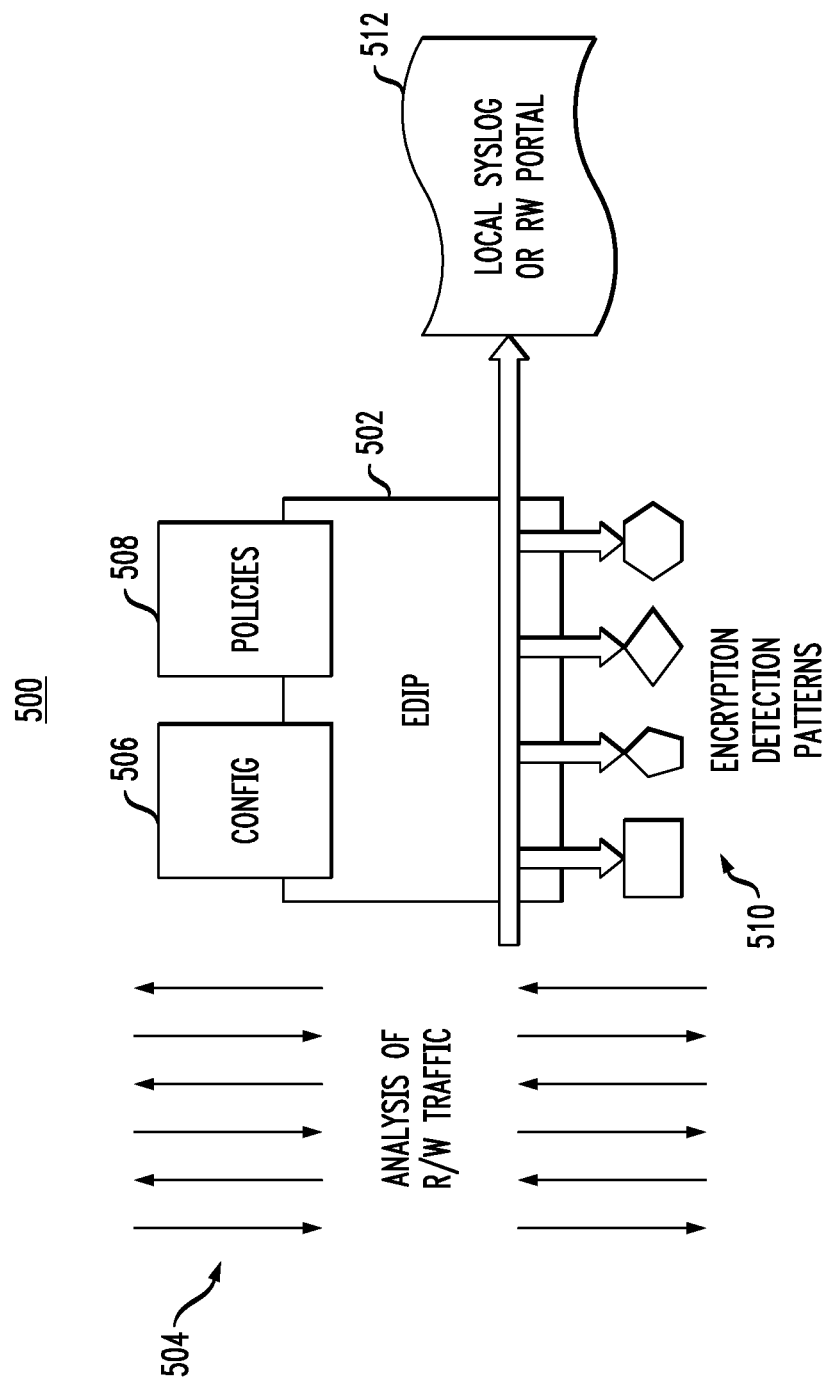
FIG. 5 illustrates operations of an EDIP module, according to an embodiment of the invention.

FIG. 5 illustrates operations of an EDIP module in an exemplary deployment 500, according to an embodiment of the invention. More particularly, as shown, an EDIP module 502 monitors and analyzes read/write traffic 504 in the layer/level of the I/O stack of the computer system in which it is deployed. The specific monitoring and analysis is dictated by the configuration 506 and policies 508 for which the EDIP module 502 is programmed or otherwise enabled. As shown in this example, the EDIP module 502 is detecting encryption patterns 510 from the read/write traffic 504. These patterns, as well as other information, are then sent to the ransomware alert center via its portal 512 (or to a local SYSLOG which then reports the information to the alert center). Thus, advantageously, given the position of the EDIP module 502 in the relevant IO/stack, it inspects read/write traffic patterns and compares them against known encryption patterns. Based on how the EDIP module 502 is configured (e.g., ignore GPG) and the policies known by the EDIP module 502 (e.g., GPG should be logged low-priority or not at all), the EDIP module 502 then notes or alerts of the presence of encryption traffic by storing it in the local SYSLOG 512 and/or forwarding it to the ransomware alert center.

Figure 6:
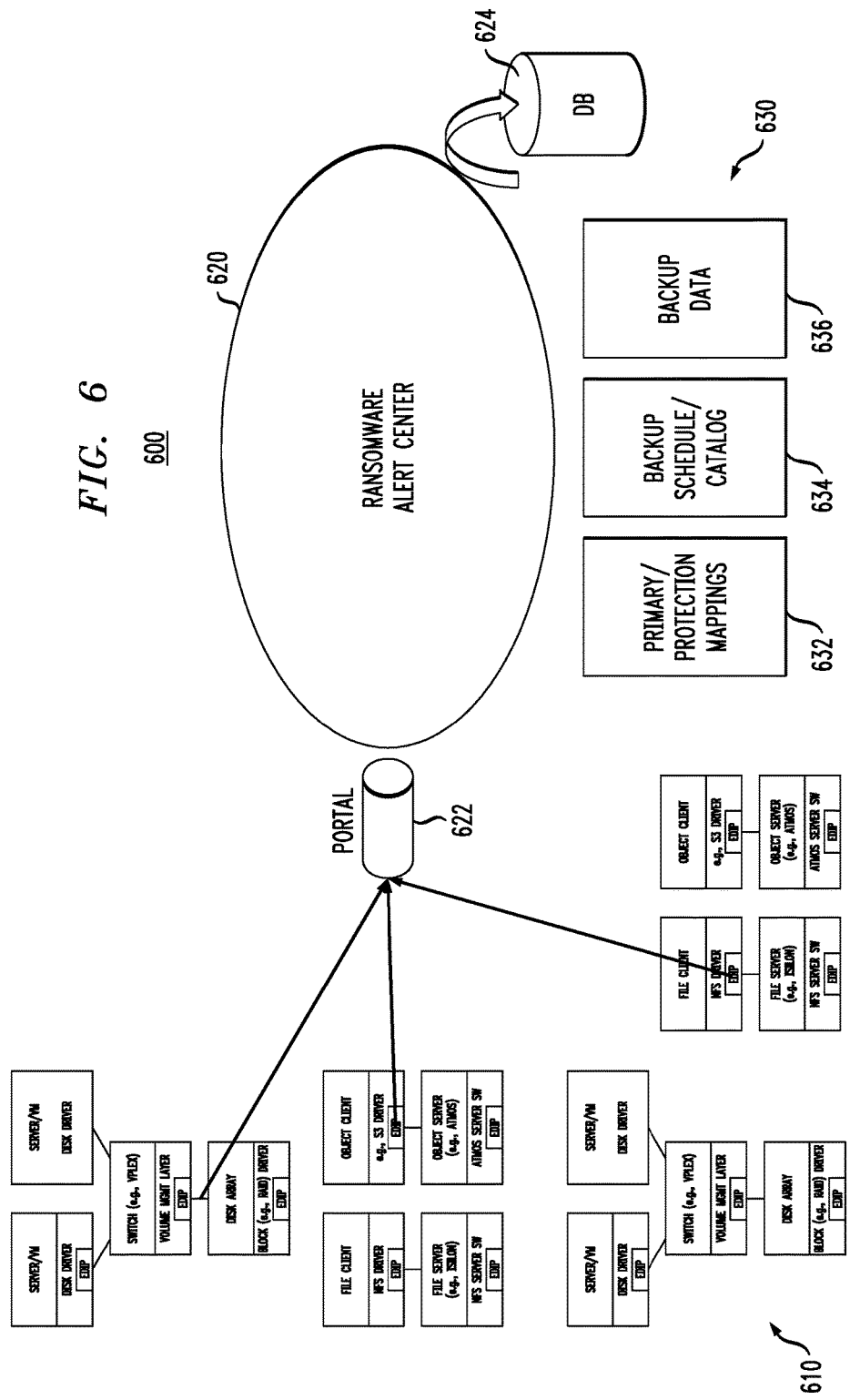
FIG. 6 illustrates a ransomware alert engine and corresponding environment, according to an embodiment of the invention.

FIG. 6 illustrates a ransomware alert center and corresponding environment 600, according to an embodiment of the invention. More particularly, as shown, a set of EDIP modules 610 are deployed in various layers/levels of a computer system being monitored and protected from ransomware. The EDIP modules 610 are operatively coupled to a ransomware alert center (engine) 620 through an interface or portal 622. A database 624 is operatively coupled to the alert center 620 and is used to store data received, generated, or otherwise derived by the alert center. The alert center 620 is operatively coupled to a data protection ecosystem 630 which includes, but is not limited to, backup and recovery mechanisms such as primary/protection mappings 632, backup schedule/catalog 634, and backup data 636. While not expressly shown in FIG. 6, it is understood that one or more EDIP module 610 can be deployed and operate in one or more of the mechanisms of the data protection ecosystem 630. Advantageously, the inventive approach described herein integrates ransomware detection functionality of the EDIP modules with the data protection ecosystem via the ransomware alert center so as to provide detection throughout the entire lifecycle of the ransomware and faster, more effective remedial actions to deal with the ransomware.

One key feature of the ransomware alert center 620 is its intimate knowledge of both the primary and protection infrastructure configurations. In order for backup/recovery systems to properly operate, the backup and recovery tools must have an intimate knowledge of the configuration of both the primary/protection systems and the pipe (e.g., backup mechanism) used to protect them. If EDIP modules are deployed throughout the primary (production) and protection (backup) infrastructure, the ransomware alert center has the ability to discern what areas are potentially being attacked with ransomware (primary or backup ecosystem).

In addition, the alert center 620 has the ability to know when ransomware attacks are occurring, and can combine that knowledge with what is already known about backup sets that are listed in the backup catalog relevant to the systems under ransomware attack. Based on this knowledge, the alert center can access the backup system, suspend backup schedules for affected systems, and identify "last known good" copies of data.

Still further, given its knowledge of the primary system, the alert center 620 can immediately perform actions such as "clone VM" as a way of capturing forensic state at the time of the ransomware appearance. The ransomware alert center 620 of course keeps track of all notifications coming from the entire ecosystem and logs them into a database (624) for analysis.

Lastly, the ransomware alert center 620 is a central location to "push" policies, configurations, and new encryption detection algorithms to the currently installed EDIP ecosystem (or at least monitor the level at which these systems are currently running).

Figure 7:
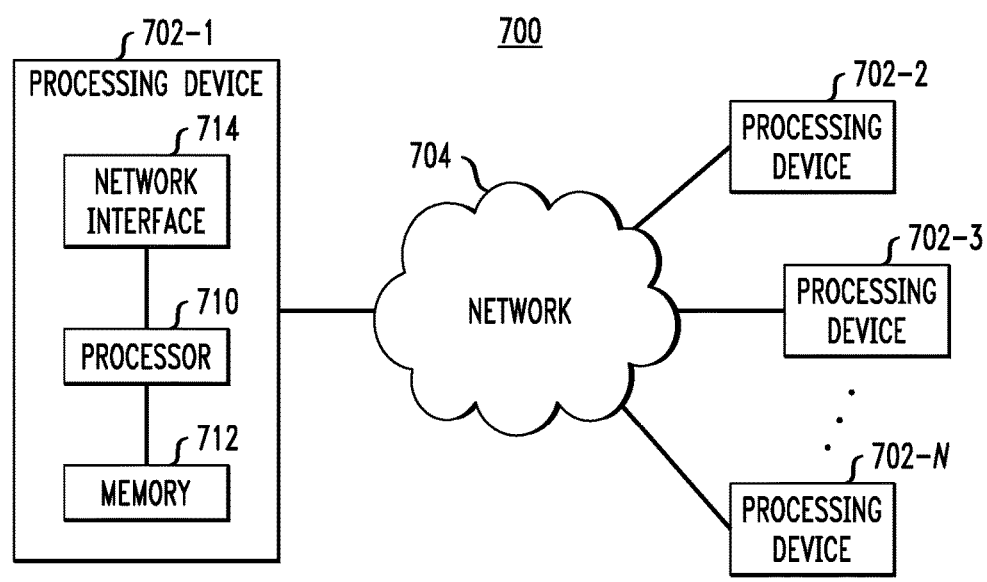
FIG. 7 illustrates a processing platform used to implement a computer system with malware detection and data protection integration, according to an embodiment of the invention.

As an example of a processing platform on which a computer system with malware detection and data protection integration (e.g., 600 of FIG. 6) according to illustrative embodiments can be implemented is processing platform 700 shown in FIG. 7. The processing platform 700 in this embodiment comprises a plurality of processing devices, denoted 702-1, 702-2, 702-3, . . . 702-N, which communicate with one another over a network 704. It is to be appreciated that the data valuation methodologies described herein may be executed in one such processing device 702, or executed in a distributed manner across two or more such processing devices 702. The cloud infrastructure environment may also be executed in a distributed manner across two or more such processing devices 702. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system and cloud infrastructure described herein may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 700 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
  monitoring a computer system via malware detection modules deployed throughout input/output layers of the computer system, wherein each malware detection module is configured to detect activity associated with malware present in the computer system, wherein the malware modules each comprise program code respectively executing on a set of processing devices, and each processing device comprises a processor and memory, and wherein the set of processing devices are operatively coupled via a communication network to form the computer system;
  upon detection of malware activity in one or more input/output layers of the computer system, one or more of the malware detection modules generating and sending respective messages reporting the detected activity to a central malware alert engine;
  receiving, at the central malware alert engine, the one or more messages from the one or more malware detection modules; and in response to the one or more received messages, the central malware alert engine alerting one or more portions of a data protection system of the computer system to enable the data protection system to take one or more remedial actions to protect the computer system from the malware present in the computer system;

wherein each malware detection module executes a set of directives to log information to assist the data protection system to determine the one or more remedial actions to take in response to the malware, and wherein the logged information comprises an identification of the input/output layer in which the malware detection module providing the message is deployed, and further wherein one or more malware detection modules at least one of recommend and initiate one or more remedial actions to take in response to the malware.

2. The method of claim 1, wherein one or more of the malware detection modules are deployed in the data protection system and configured to detect malware activity in the data protection system.

3. The method of claim 1, wherein the data protection system comprises one or more data backup and data recovery mechanisms of the computer system.

4. The method of claim 1, wherein each malware detection module comprises program code configured to detect a given activity of the malware present in the computer system.

5. The method of claim 1, wherein each malware detection module comprises program code configured to communicate with the central malware alert engine to send messages reporting a given detected activity of the malware.

6. The method of claim 1, wherein the logged information comprises an identification of an application program executing at the input/output layer in which the malware detection module providing the message is deployed.

7. The method of claim 1, wherein each malware detection module comprises program code configured to determine whether or not to generate or send a message to the central malware alert engine based on awareness of one or more policies relating to the malware activity in comparison to permitted activity in the computer system.

8. The method of claim 1, further comprising the central malware alert engine sending an update to one or more of the malware detection modules, wherein the update modifies detection functionalities in the one or more malware detection modules.

9. The method of claim 1, wherein the input/output layers of the computer system comprise a host driver layer, a network driver layer, and a storage system layer.

10. The method of claim 1, wherein each malware detection module is configured to support one or more data access protocols.

11. The method of claim 1, wherein the malware comprises ransomware and the detected activity comprises ransomware data encryption activity.

12. The method of claim 11, wherein at least one malware detection module is configured to analyze read and write traffic to detect the ransomware data encryption activity.

13. The method of claim 12, wherein the malware detection module analyzes read and write traffic by inspecting read and write traffic patterns and comparing the inspected patterns to known encryption patterns.

14. The method of claim 11, wherein the computer system comprises a client side and a server side, and malware detection modules are deployed to detect the ransomware data encryption activity in one or more input/output layers on the client side and one or more input/output layers on the server side.

15. The method of claim 1, wherein the computer system comprises a data center.

16. A system, comprising:
a set of processing devices, wherein each processing device comprises a processor and memory, and wherein the set of processing devices are operatively coupled via a communication network to form a computer system;
a set of malware detection modules deployed throughout input/output layers of the computer system, wherein the set of malware modules each comprise program code respectively executing on the set of processing devices; and
a central malware alert engine operatively coupled to the set of malware detection modules through an interface;
wherein each malware detection module detects activity associated with malware present in the computer system and, upon detection of malware activity in one or more input/output layers of the computer system, one or more of the malware detection modules generate and send respective messages reporting the detected activity to the central malware alert engine;
further wherein the central malware alert engine receives the one or more messages from the one or more malware detection modules and, in response to the one or more received messages, the central malware alert engine alerts one or more portions of a data protection system of the computer system to enable the data protection system to take one or more remedial actions to protect the computer system from the malware present in the computer system;
further wherein each malware detection module executes a set of directives to log information to assist the data protection system to determine the one or more remedial actions to take in response to the malware, and wherein the logged information comprises an identification of the input/output layer in which the malware detection module providing the message is deployed, and further wherein one or more malware detection modules at least one of recommend and initiate one or more remedial actions to take in response to the malware.

17. An apparatus, comprising:
a memory configured to store one or more instructions; and
a processor device operatively coupled to the memory and configured to obtain the one or more instructions from the memory to execute a given malware detection module, wherein the given malware detection module is part of a set of malware detection modules deployed throughout input/output layers of a computer system, wherein the processor and the memory are part of a set of processing devices respectively executing the set of malware detection modules, and wherein the set of processing devices are operatively coupled via a communication network to form the computer system, and wherein the given malware detection module is configured to:
detect activity associated with malware present in the computer system; and
upon detection of malware activity in the layer in which the given malware detection module is deployed, the given malware detection module generates and sends at least one message reporting the detected activity to a central malware alert engine which, receives the message and in response to the received message, the central malware alert engine is configured to alert one or more portions of a data protection system of the computer system to enable the data protection system to take one or more remedial actions to protect the computer system from the malware present in the computer system;

wherein the given malware detection module executes a set of directives to log information to assist the data protection system to determine the one or more remedial actions to take in response to the malware, and wherein the logged information comprises an identification of the input/output layer in which the malware detection module providing the message is deployed, and further wherein the given malware detection module at least one of recommends and initiates one or more remedial actions to take in response to the malware.

18. The system of claim 17, wherein the malware comprises ransomware and the detected activity comprises ransomware data encryption activity.

19. The system of claim 18, wherein the given malware detection module is configured to analyze read and write traffic to detect the ransomware data encryption activity.

20. The system of claim 19, wherein the given malware detection module analyzes read and write traffic by inspecting read and write traffic patterns and comparing the inspected patterns to known encryption patterns.

* * * * *